United States Patent
Ponomarev et al.

(10) Patent No.: US 12,415,317 B2
(45) Date of Patent: Sep. 16, 2025

(54) DEPOWDERING AN ELASTIC 3D PRINTED OBJECT

(71) Applicant: Peridot Print LLC, Palo Alto, CA (US)

(72) Inventors: Edward Stanley Ponomarev, San Diego, CA (US); Stephan Walter Emmenegger, San Diego, CA (US); Geoffrey Schmid, San Diego, CA (US)

(73) Assignee: Peridot Print LLC, Palo Alo, CA (US)

( * ) Notice: Subject to any disclaimer, the term of this patent is extended or adjusted under 35 U.S.C. 154(b) by 0 days.

(21) Appl. No.: 18/031,292

(22) PCT Filed: Oct. 19, 2020

(86) PCT No.: PCT/US2020/056396
§ 371 (c)(1),
(2) Date: Apr. 11, 2023

(87) PCT Pub. No.: WO2022/086497
PCT Pub. Date: Apr. 28, 2022

(65) Prior Publication Data
US 2024/0017494 A1 Jan. 18, 2024

(51) Int. Cl.
| B29C 64/35 | (2017.01) |
| B08B 1/34 | (2024.01) |
| B08B 5/02 | (2006.01) |
| B08B 5/04 | (2006.01) |
| B29C 64/379 | (2017.01) |
| B33Y 40/20 | (2020.01) |
| B33Y 80/00 | (2015.01) |

(52) U.S. Cl.
CPC ............... B29C 64/35 (2017.08); B08B 1/34 (2024.01); B08B 5/023 (2013.01); B08B 5/043 (2013.01); B29C 64/379 (2017.08); *B33Y 40/20* (2020.01); *B33Y 80/00* (2014.12)

(58) Field of Classification Search
CPC .... B08B 1/32; B08B 1/34; B08B 5/02; B08B 5/023; B08B 5/043; B29C 64/35; B29C 64/379; B33Y 40/00; B33Y 40/20; B33Y 80/00
See application file for complete search history.

(56) References Cited

U.S. PATENT DOCUMENTS

| 6,799,959 B1 | 10/2004 | Tochimoto et al. |
| 9,475,234 B2 | 10/2016 | Morikawa |
| 10,377,061 B2 | 8/2019 | Wolfgang et al. |
| 2001/0045678 A1 | 11/2001 | Kubo et al. |

(Continued)

FOREIGN PATENT DOCUMENTS

| CN | 107825706 A | * 3/2018 |
| CN | 207996863 U | 10/2018 |
| EP | 1099534 A2 | 5/2001 |

(Continued)

OTHER PUBLICATIONS

CN107825706A machine translation (Year: 2018).*

Primary Examiner — Douglas Lee
(74) Attorney, Agent, or Firm — Michael Dryja

(57) ABSTRACT

In one example, a process for depowdering an elastic object made with a 3D printer using powdered build material includes compressing the object progressively from one end of the object to another end of the object.

5 Claims, 4 Drawing Sheets

(56) References Cited

U.S. PATENT DOCUMENTS

2015/0266211 A1* 9/2015 Wolfgang .............. B33Y 40/20
                                                    425/424
2016/0236422 A1* 8/2016 Sakura ...................... B08B 5/02

FOREIGN PATENT DOCUMENTS

WO      2018/140021 A1    8/2018
WO      2020/076295 A1    4/2020

* cited by examiner

100 ⇘

┌─────────────────────────────────────────────────────┐
│ COMPRESSING A PLIABLE 3D PRINTED OBJECT             │
│ PROGRESSIVELY FROM ONE END OF THE OBJECT            │
│ 102 — TO ANOTHER END OF THE OBJECT                  │
└─────────────────────────────────────────────────────┘

┌─────────────────────────────────────────────────────┐
│ COMPRESSING A PLIABLE 3D PRINTED LATTICE            │
│ STRUCTURE PROGRESSIVELY FROM ONE END OF THE         │
│ 112 — STRUCTURE TO ANOTHER END OF THE STRUCTURE     │
└─────────────────────────────────────────────────────┘
                            │
┌─────────────────────────────────────────────────────┐
│ WHILE COMPRESSING THE LATTICE STRUCTURE             │
│ PROGRESSIVELY FROM ONE END OF THE                   │
│ STRUCTURE TO ANOTHER END OF THE                     │
│ 114 — STRUCTURE, BLOWING AIR THROUGH THE            │
│ LATTICE STRUCTURE                                   │
└─────────────────────────────────────────────────────┘

FIG. 5

DEPOWDERING AN ELASTIC 3D PRINTED OBJECT

BACKGROUND 3D printers, sometimes called additive manufacturing machines, produce objects by building up layers of material. Digital data is processed into slices each defining that part of a layer of build material to be made into the object. In some additive manufacturing machines, the object slices are made in a powdered build material spread in layers over the build area. Heat may be used to fuse together the particles in each of the successive layers of powder to make a solid object. Manufacturing proceeds layer by layer and slice by slice until the object is complete.

DRAWINGS

FIGS. 4 and 5 illustrate example processes for depowdering an elastic object printed with a powder based 3D printer; and The same part numbers designate the same or similar parts throughout the figures. The figures are not necessarily to scale.

DESCRIPTION

Figure 1:
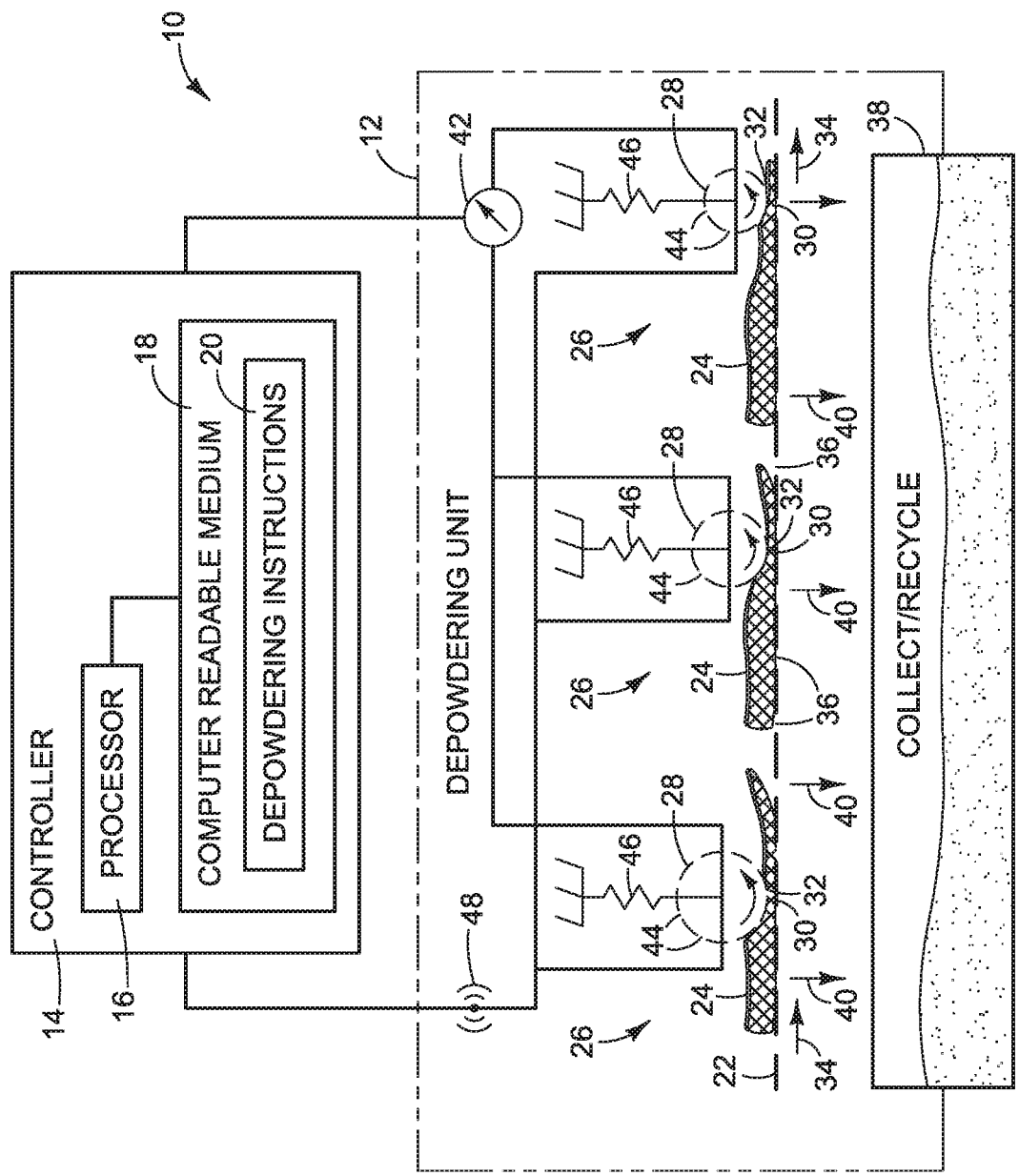
FIG. 1 illustrates a system implementing one example of a depowdering unit for depowdering an elastic object printed with a powder based 3D printer.

In some 3D printing processes, object layers of corresponding digital slices are generated successively one after another in a powdered build material spread in layers over a build area. Heat is used to selectively fuse together the particles in each of the successive layers of build material powder in a desired pattern corresponding to the solid 3D object to be generated. Manufacturing proceeds layer by layer based on corresponding slices until the 3D object is complete. Multiple objects may be generated at the same time in the same layers of build material.

When the 3D objects are complete, they are removed from the surrounding unfused build material. Some of the unfused build material may cling to the objects after they are removed from the powder bed. The subsequent process of removing unfused build material from the objects is commonly referred to as "depowdering." Examples of powder based 3D printing include selective laser melting, selective laser sintering, and multi-jet fusion.

Elastic midsoles for athletic and other footwear are now being manufactured with powder based 3D printers using thermoplastic polyurethane and other elastomeric build materials. Some midsoles are made with a lattice structure to provide the desired degree of cushioned foot support. It can be difficult to thoroughly remove unfused build material from latticed midsoles, for example removing agglomerated clumps of unfused build material trapped in the lattice structure.

A new technique has been developed to more thoroughly depowder latticed midsoles and to help increase the depowdering operation throughput. In one example, a process for depowdering a latticed midsole includes compressing the midsole progressively from one end of the midsole to the other end of the midsole to flex each part of the lattice structure, loosening unfused build material within the structure while enabling an "assembly line" process to help increase processing throughput. For example, the localized flexing that occurs progressively along the length of an elastic, latticed midsole squeezed between two compression rollers helps break up clumps of agglomerated build material within the lattice structure while also breaking down the adhesion between unfused build material and the structure itself. Simultaneously with compressing the midsole, loose and loosened build material may be blown out of the lattice structure and off the midsole with pressurized air and vacuumed away for collection and recycling.

Examples of the new depowdering technique not limited to latticed midsoles, lattice structures in general, or other elastic objects with complex geometries but may implemented with any elastic objects made with a 3D printer. The examples described herein illustrate but do not limit the scope of the patent which is defined in the Claims following this Description.

As used in this document, "and/or" means one or more of the connected things; a "nip" means the region of a squeezing device where the squeezing parts are closest together; "elastic" means capable of recovering size and shape after deformation; and a "computer readable medium" means any non-transitory tangible medium that can embody, contain, store, or maintain information and instructions for execution by a processor and may include, for example, circuits, integrated circuits, ASICs (application specific integrated circuits), hard drives, random access memory (RAM), read-only memory (ROM), and flash memory.

FIG. 1 illustrates an example system 10 for depowdering an elastic object made with a 3D printer using a powdered build material. Referring to FIG. 1, depowdering system 10 includes a depowdering unit 12 to remove unfused build material from the object and a controller 14 operatively connected to depowdering unit 12. Controller 14 includes the programming, processing and associated memory resources, and the other electronic circuitry and components to control the operative elements of system 10. Controller 14 may include distinct control elements for individual system components. In particular, controller 14 in FIG. 1 includes a processor 16 and a computer readable medium 18 operatively connected to processor 16. Depowdering instructions 20 on computer readable medium 18 represent programming that enables controller 14 to control the operation of depowdering in unit 12. A depowdering system 10 may be implemented, for example, in a depowdering module that is part of a 3D printer or at a depowdering station separate or even remote from the printer.

In the example shown in FIG. 1, depowdering unit 12 includes a conveyor 22 that carries latticed midsoles or other elastic objects 24 through a series of squeezing devices 26. Each device 26 includes a compression roller 28 and an opposing surface 30. In this example, surface 30 is implemented as the top side of conveyor 22. Each object 24 is repeatedly compressed progressively from one end to the other end at a nip 32 between roller 28 and surface 30 as the object is carried through squeezing devices 26. Each of the repeated, progressive compressions flexes the object to break agglomerations, loosen and thereby fluidize unfused build material clinging to the object, including the interior parts of a lattice structure (where the objects are latticed midsoles for example).

Figure 2:
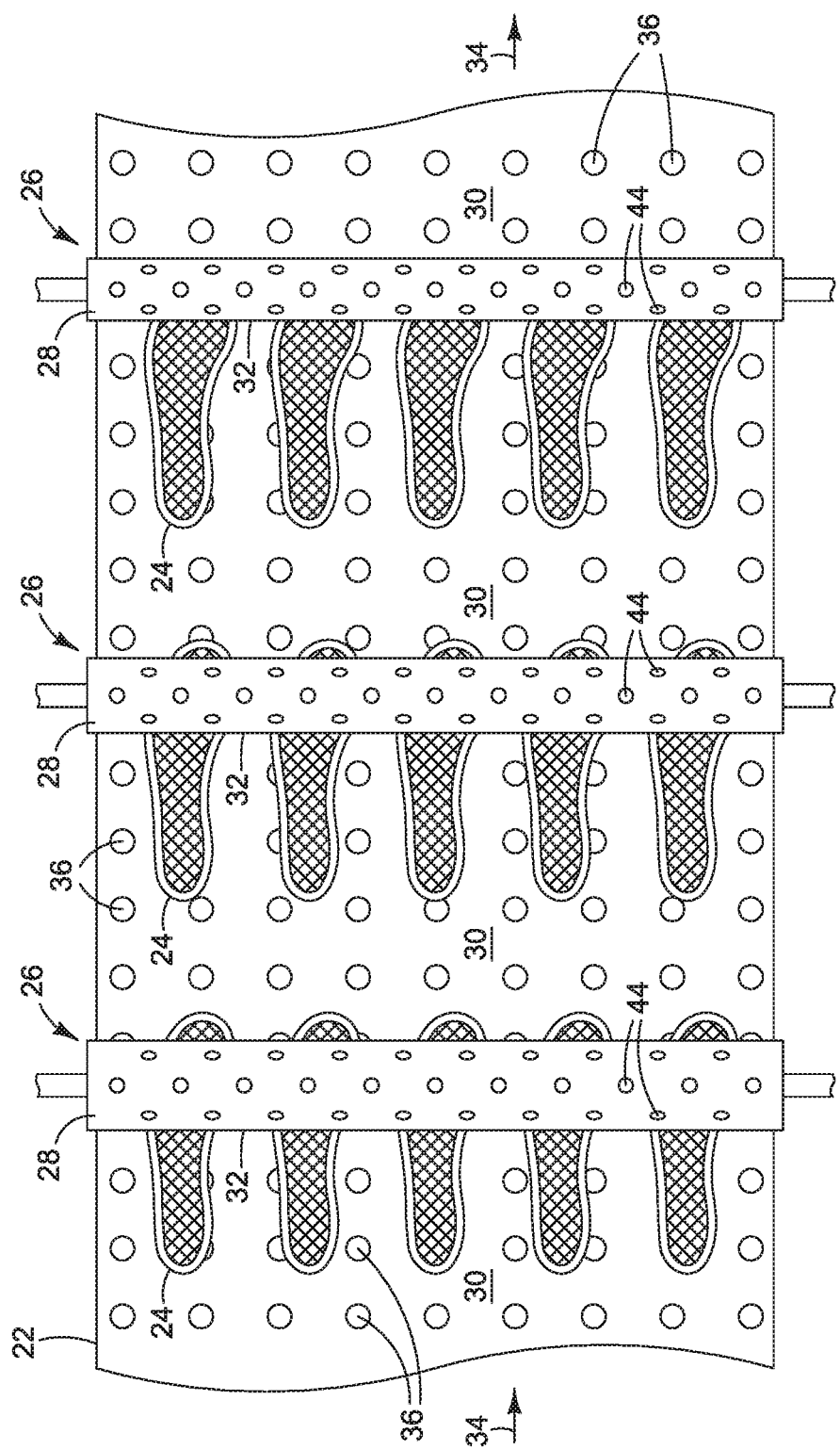
FIG. 2 illustrates an example layout for objects on a depowdering conveyor in the system shown in FIG. 1.

FIG. 2 illustrates an example layout for objects 24 on conveyor 22. Referring to FIGS. 1 and 2, in this example each roller 28 is oriented 90° with respect to the line of travel 34 of conveyor 22. In other examples, one or more of the rollers 28 could be skewed with respect to the line of travel 34 of the conveyor. Conveyor 22 includes openings 36 so that a vacuum may be applied to suck loose build material away from objects 24, for example to a collection bin 38, as indicated by arrows 40 in FIG. 1. In some examples, depowdering unit 12 may include a source 42 of pressurized air operatively connected to each roller 28. Each roller 28 includes perforations, nozzles, or other openings 44 so that pressurized air may be applied to each object 24 as the object is compressed, including through the interior parts of a lattice structure (where the objects are latticed midsoles for example), to help loosen unfused build material clinging to the object and to blow loose build material away from the object.

As shown in FIGS. 1 and 2, squeezing devices 26 may use a different size roller 28 in each squeezing device 26. In this example, objects 24 are compressed by progressively smaller diameter rollers 28 for more concentrated flexing to help loosen any unfused build material still clinging to the objects. Other configurations for a squeezing device 26 are possible. For example, some or all of the compression rollers could be oriented vertically and positioned alongside a conveyor to compress each object 24 from side to side, instead of or in addition to compressing the objects from top to bottom.

As shown in FIG. 1, constant force springs 46 operatively connected to each roller 28 may be used to maintain a constant compression force on each object 24 as it passes through a squeezing device 26. Other suitable mechanisms for maintaining a constant compression force are possible including, for example, a closed loop feedback system with force transducers at each roller 28 to automatically adjust the force applied to rollers 28 and thus objects 24. In other examples, nip 32 is set to a fixed gap to squeeze each object 24 to a predetermined thickness.

Also in this example, as shown in FIG. 1, an oscillator 48 operatively connected to each roller 28 may be used to vibrate and/or hammer an object 24 with roller 28 as the object passes through nip 32 to help loosen unfused build material clinging to the object. An oscillator 48 may be implemented, for example, with an acoustic vibrator to vibrate rollers 28 and thus objects 24 and/or a crankshaft for reciprocating rollers 28 to hammer objects 24.

In one example, rollers 28 are implemented as idler rollers. In another example, rollers 28 are implemented as driven rollers. Also, where the degree of compression is controlled by rollers 28, as in the example shown in FIG. 1, it may be desirable to implement opposing surface 30 as a flat, rigid surface. In other examples, opposing surface 30 may be implemented as a curved and/or flexible surface.

Figure 3:
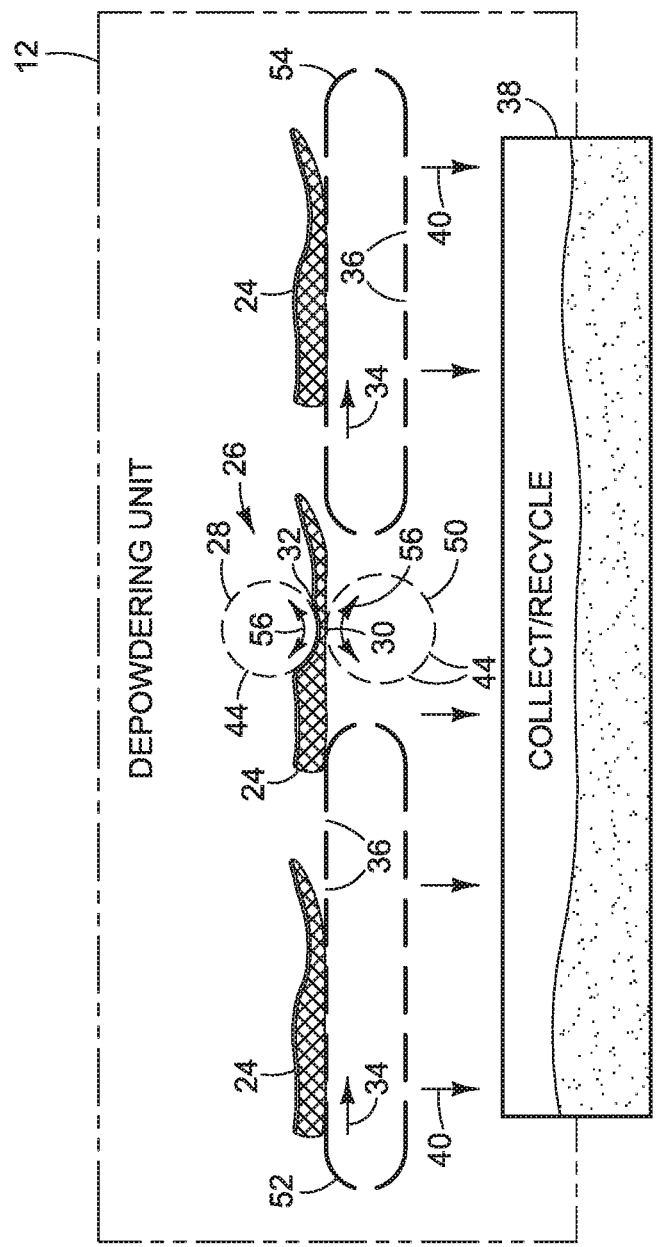
FIG. 3 illustrates another example of a depowdering unit for a system such as that shown in FIG. 1.

FIG. 3 illustrates another example of a depowdering unit 12 for a depowdering system. In this example, unit 12 includes a squeezing device 26 with two rollers 28, 50 that form a nip 32, a first conveyor 52 that carries elastic 3D printed objects 24 to nip 32, and a second conveyor 54 that carries objects 24 away from nip 32. In this example, the surface 30 opposing roller 28 in squeezing device 26 is formed by roller 50. One or both rollers 28, 50 is a driven roller to move objects 24 through nip 32. Each object 24 is compressed progressively from one end to the other end at nip 32. The compression flexes the object to loosen unfused build material clinging to the object, including the interior parts of a lattice structure (where the objects are latticed midsoles for example). Each object 24 may be driven forward and backward through nip 32, as indicated by bidirectional rotation arrows 56 in FIG. 3, for example to repeatedly compress the object through nip 32.

FIG. 4 illustrates an example process 100 for depowdering an elastic object printed with a powder based 3D printer. Process 100 may be implemented, for example, by a controller 14 executing instructions 20 in a depowdering system 10 shown in FIG. 1. Referring to FIG. 4, process 100 includes compressing the elastic object progressively from one end of the object to another end of the object (block 102), for example as described above with reference to FIGS. 1 and 2. Compressing the object progressively end to end in this context means compressing the object lengthwise, crosswise (i.e., side to side), and/or diagonally. Process 100 may also include blowing air on to the object simultaneously with compressing the object, vibrating the object simultaneously with compressing the object, and/or hammering the object simultaneously with compressing the object, for example as described above with reference to FIGS. 1 and 2.

FIG. 5 illustrates an example process 110 for depowdering an elastic, lattice structure object printed with a powder based 3D printer. Process 110 may be implemented, for example, by a controller 14 executing instructions 20 in a depowdering system 10 shown in FIG. 1. Referring to FIG. 5, process 110 includes compressing the object progressively from one end of the structure to another end of the structure (block 112) and, while compressing the structure, blowing air through the lattice structure (block 114), for example as described above with reference to FIGS. 1 and 2. Process 110 may also include sucking air away from the lattice structure simultaneously with the compressing and blowing, for example as described above with reference to FIG. 1.

"A", "an", and "the" as used in the Claims means one or more unless "only one" thing is recited. For example, "a roller" means one or more rollers and subsequent reference to "the roller" means the one or more rollers.

The examples shown in the figures and described above illustrate but do not limit the scope of the patent, which is defined in the following Claims.

The invention claimed is:

1. A depowdering method comprising:
   conveying, along a conveyor of a depowdering device and from a first end of the depowdering device to a second end of the depowdering device, an elastic object that has been additively manufactured using powdered build material; and
   compressing, by each of one or more squeezing devices of the depowdering device positioned above the conveyor, the elastic object progressively from a first end of the elastic object to a second end of the elastic object in correspondence with conveyance of the elastic object along the conveyor under the each of the one or more of squeezing devices, by coming into contact with and actively pressing down on the elastic object;
   wherein compression of the elastic object fluidizes unfused powdered build material clinging to the elastic object after additive manufacture, to depowder the elastic object.

2. The depowdering method of claim 1, wherein the one or more squeezing devices comprises a plurality of squeezing devices spatially arranged from the first end to the second end of the depowdering device, such that compressing the elastic object comprises comprising repeatedly compressing the elastic object progressively from the first end to the second end of the elastic object a number of times equal to a number of the plurality of squeezing devices.

3. The depowdering method of claim 1, further comprising vibrating and/or hammering, by each of the one or more of the squeezing devices, as the elastic object is conveyed along the conveyor along and is compressed by each of the one or more of the squeezing devices.

4. The process depowdering method of claim 1, further comprising blowing air through a lattice structure of the elastic object as the elastic object is conveyed along the conveyor, to remove the unfused powdered build material that has been fluidized from the elastic object.

5. The depowdering method of claim 1, comprising suctioning, through a plurality of openings of the conveyor and as the elastic object is conveyed along the conveyor, the unfused powdered build material that has been fluidized into a collection bin of the depowdering device positioned under the conveyor.

\* \* \* \* \*